United States Patent
Francis et al.

(10) Patent No.: US 7,004,398 B1
(45) Date of Patent: Feb. 28, 2006

(54) STORED-VALUE CARD WITH EDIBLE PRODUCT

(75) Inventors: Michael R. Francis, Minneapolis, MN (US); Barry C. Brooks, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 11/037,837

(22) Filed: Jan. 18, 2005

(51) Int. Cl.
*G06K 7/00* (2006.01)

(52) U.S. Cl. ............... 235/486; 235/487; 235/380; 235/385; 235/492; 705/14; 705/39; 705/400

(58) Field of Classification Search ............... 235/486, 235/380, 492, 385, 487; 705/39, 400, 14
See application file for complete search history.

(56) References Cited

U.S. PATENT DOCUMENTS

| | | | |
|---|---|---|---|
| 3,762,628 A | 10/1973 | Sargent | |
| 5,236,725 A * | 8/1993 | McCormack et al. | 426/106 |
| 5,607,101 A | 3/1997 | Saito | |
| 5,840,355 A | 11/1998 | Prescott et al. | |
| 2002/0088855 A1 * | 7/2002 | Hodes | 235/385 |
| 2002/0154137 A1 | 10/2002 | Ben-David | |
| 2002/0180206 A1 | 12/2002 | Tronrud | |
| 2003/0050839 A1 * | 3/2003 | Shiomi | 705/14 |
| 2003/0150142 A1 * | 8/2003 | Street | 40/124.11 |
| 2004/0046035 A1 * | 3/2004 | Davila et al. | 235/487 |
| 2004/0249748 A1 * | 12/2004 | Schultz et al. | 705/39 |
| 2005/0060269 A1 * | 3/2005 | Gaikoski | 705/400 |
| 2005/0061872 A1 * | 3/2005 | Paschini et al. | 235/380 |

* cited by examiner

*Primary Examiner*—Jared J. Fureman
*Assistant Examiner*—Allyson N Trail
(74) *Attorney, Agent, or Firm*—Dicke, Billig & Czaja, PLLC (57) ABSTRACT

A stored-value card assembly including a stored-value card, an edible product, and a wrapper. The stored-value card defines a first generally planar surface and a second generally planar surface opposite the first generally planar surface. An account identifier is included on the second generally planar surface and links the stored-value card to at least one of a financial account and a financial record. The edible product is removably secured to the first generally planar surface of the stored-value card. The wrapper encloses the edible product in a manner adapted to protect the edible product from contamination. Other stored-value card assemblies, methods of promoting sales of stored-value cards, methods, of using a stored-value card and other embodiments are also disclosed.

24 Claims, 6 Drawing Sheets

STORED-VALUE CARD WITH EDIBLE PRODUCT

BACKGROUND OF THE INVENTION

Stored-value cards and other financial transactions cards come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a stored-value card assembly including a stored-value card, an edible product, and a wrapper. The stored-value card defines a first generally planar surface and a second generally planar surface opposite the first generally planar surface. An account identifier is included on the second generally planar surface and links the stored-value card to at least one of a financial account and a financial record. The edible product is removably secured to the first generally planar surface of the stored-value card. The wrapper encloses the edible product in a manner adapted to protect the edible product from contamination. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A gift card or other stored-value card is adapted for making purchases of goods and/or services from e.g. a retail store or website. According to one embodiment, an original consumer buys a stored-value card to give a recipient who in turn is able to use the stored-value card at a retail store or setting to pay for the goods and/or services. A stored-value card assembly, according to embodiments of the present invention, provides the consumer with a confectionary treat or edible product in addition to the ability to pay for goods and/or services with a stored-value card. In one embodiment, the additional edible aspect of the stored-value card assembly promotes the sale and/or loading of the stored-value card by potential consumers and/or bearers of the stored-value card.

Figure 1:
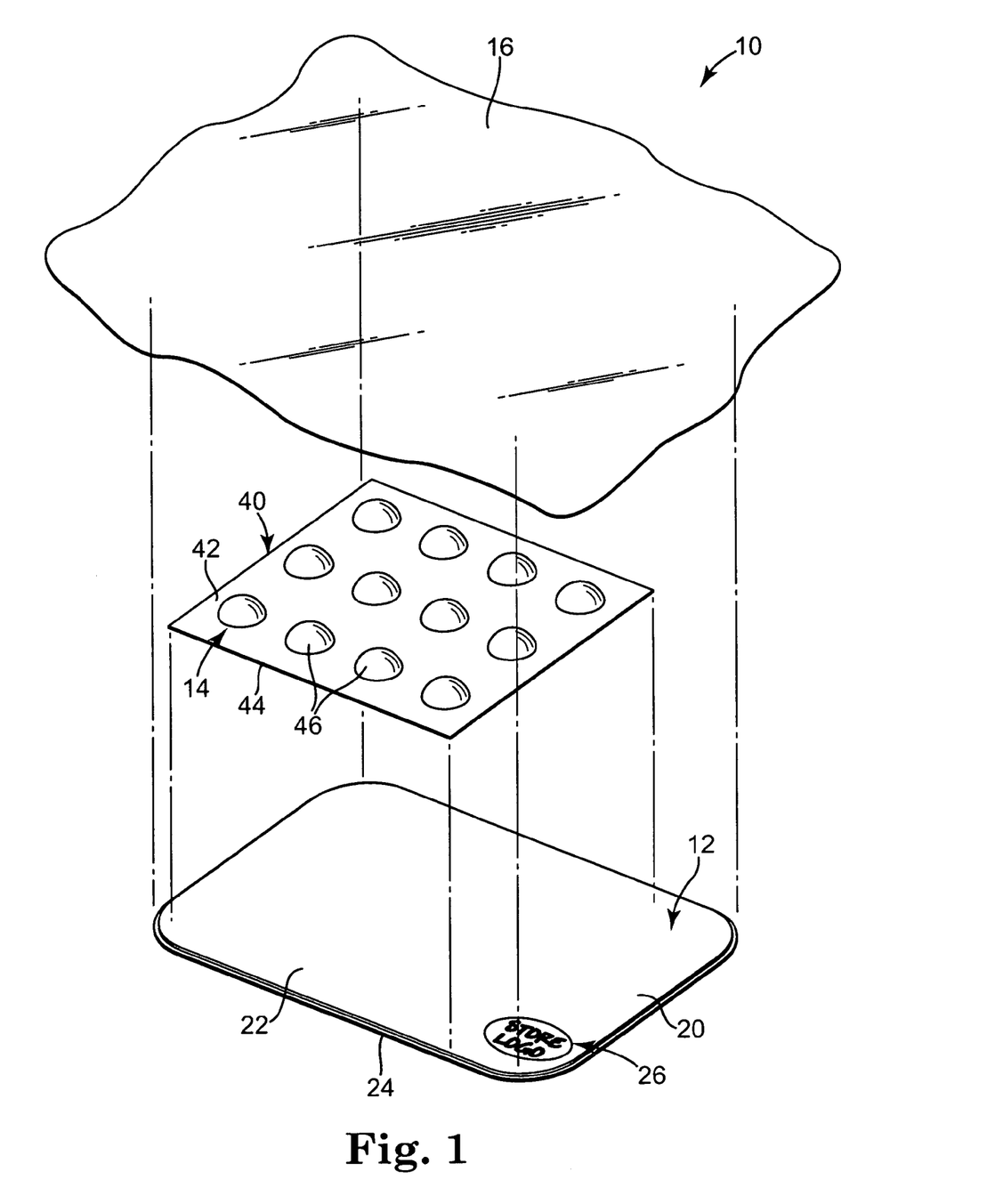
FIG. 1 is an exploded, top perspective view of one embodiment of a stored-value card assembly, according to the present invention.

Turning to the figures, FIG. 1 illustrates an exploded, top perspective view of one embodiment of a stored-value card assembly 10, according to the present invention. The stored-value card assembly 10 includes a stored-value card 12, a candy, confectionary, or other edible product 14, and a wrapper 16. Stored-value card 12 provides overall rigidity to stored-value card assembly 10 and supports candy 14. Wrapper 16 extends about the remainder of stored-value card assembly 10 to protect candy 14 from external contamination and/or to effectively secure candy 14 to stored-value card 12.

Figure 2:
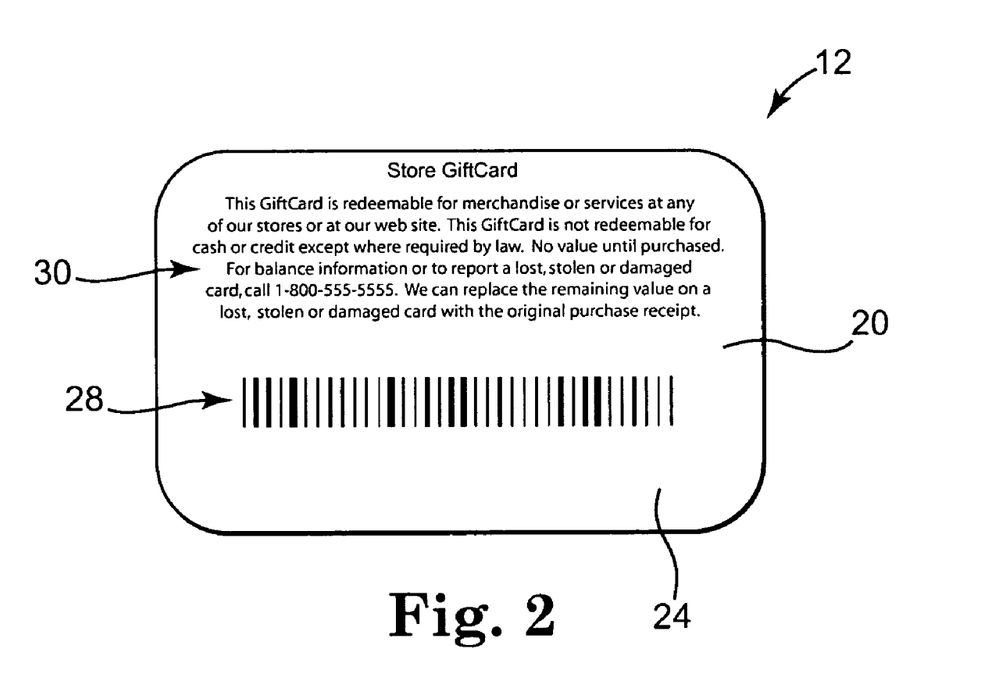
FIG. 2 is a bottom view of a stored-value card of the stored-value card assembly of FIG. 1, according to the present invention.

One embodiment of stored-value card 12 is illustrated with additional reference to FIG. 2. Stored-value card 12 includes a generally planar panel 20 defining a first planar surface 22 and a second generally planar surface 24 opposite first surface 22. In one embodiment, planar panel 20 is generally rectangular in shape and is of a size similar to that of an identification card, a credit card, or other card sized to fit in a wallet of a card bearer. In particular, in one embodiment, stored-value card 12 is about 8.5 cm long, about 5.5 cm wide, and less than about 1 mm thick. In other embodiments, primary panel 20 is otherwise shaped as a square, circle, oval, star, or any other suitable shape. Accordingly, planar panel 20 is formed of a somewhat rigid yet flexible material similar to that commonly used for identification cards, credit cards, etc. In one embodiment, planar panel 20 is formed of a paper, card stock, plastic, e.g. polycarbonate or polyvinyl chloride (PVC), etc. In one embodiment, planar panel 20 is formed of injection molded plastic or cut from sheet-stock plastic material. Accordingly, planar panel 20 is one example of means for providing rigidity to stored-value card assembly 10.

First surface 22 is configured to receive candy 14 and, in one example, includes brand indicia 26. In one embodiment, brand indicia 26 identify a brand, e.g. a product brand, a store brand, etc., associated with stored-value card assembly 10. In one embodiment, first surface 22 is printed with or otherwise includes a background design, seasonal or holiday identifier, media format indicia, and/or any other suitable indicia. Indicia 26 and other indicia disposed on stored-value card 12 is one example of means for associating stored-value card assembly 10 with at least one of a product, a brand, a store, a holiday, or season, an occasion, and media format (e.g. characters, logos, scenes, or other illustrations or photographs relating to at least one of a movie, television show, book, video game, etc.).

Stored-value card 12 includes an account identifier 28, such as a barcode, a magnetic strip, a smart chip or other electronic device, a radio frequency identification device, or other suitable identifier readily readable by a point-of-sale terminal, account access station, kiosk, or other suitable device. In one embodiment, account identifier 28 is printed on second surface 24 of stored-value card 12. Account identifier 28 indicates a financial account or record to which stored-value card 12 is linked. The account or record of the monetary balance on stored-value card 12 optionally is maintained on a database, other electronic or manual record-keeping system, or, in the case of "smart" cards, for example, on a chip or other electronic device on stored-value card 12 itself. Accordingly, by scanning account identifier 28, a financial account or record linked to stored-value card 12 is identified and can subsequently be activated, have amounts debited therefrom, and/or have amounts added thereto. With the above in mind, account identifier 28 is one example of means for linking stored-value card 12 with a financial account or record and is one example of means for activating or loading value on stored-value card 12.

In one embodiment, redemption indicia 30 are included on second surface 24. Redemption indicia 30 indicate that stored-value card assembly 10 is redeemable for the purchase of goods and/or services and that, upon use, a value of the purchased goods and/or services will be deducted from the financial account or record linked to stored-value card 12. In one embodiment, redemption indicia 30 include phrases such as "<NAME OF STORE>GiftCard" and "This GiftCard is redeemable for merchandise or services at any of our stores or at our website," and/or provides help or phone line information in the case of a lost, stolen, or damaged stored-value card, etc. In one embodiment, other indicia are also included on second surface 24 including other objects, texts, backgrounds, graphics, etc.

In one embodiment, candy 14 is a sugar-based candy with a hard candy shell generally similar to old-fashioned candy buttons. As such, candy 14 is placed on a paper or intermediate card 40 to support candy 14. In particular, paper card 40 is a sheet medium and defines a top generally planar surface 42 and a bottom generally planar surface 44 opposite top surface 42. Paper card 40 is sized to fit upon planar panel 20 of stored-value card 12 without overlapping or extending beyond the edges of planar panel 20. A plurality of candy pieces 46 of candy 14 are secured to top surface 42 of paper card 40. More specifically, candy pieces 46 are arranged on top surface 42 in an array that is aesthetically appealing to consumers.

In particular, in one example, each candy piece 46 is a sugar confectionary dropped during manufacturing onto paper card 40 in an uncured or relatively soft state. In one embodiment, once dropped on paper card 40 the relatively soft candy pieces 46 at least partially seep into the grains or porous surfaces of paper card 40. Upon an elapse of time or curing, each of the plurality of candy pieces 46 forms a hard candy shell. Accordingly, each candy piece 46 hardens such that the shell is formed at least partially extending into the porous surfaces of paper card 40, thereby securing each candy piece 46 to paper card 40. By securing candy pieces 46 to paper card 40 in this manner, each candy piece 46 is removable from paper card 40 by breaking each candy piece 46 from the portion of the respective hard candy shell formed within the porous surfaces of paper card 40.

Paper card 40 with candy pieces 46 secured to top surface 42 is placed upon planar panel 20. In particular, bottom surface 44 of paper card 40 is placed upon first surface 22 of stored-value card 12. In one example, bottom surface 44 is adhered to first surface 22. Accordingly, the relatively rigid stored-value card 12 supports paper card 40 with candy pieces 46. In one embodiment, candies, confectionaries 14, or edible product other than the one or more candy pieces 46 are contemplated. In addition, in one example, candy 14 or candy pieces 46 are placed directly upon stored-value card 12 rather than intermediately interfacing with paper card 40.

Figure 3:
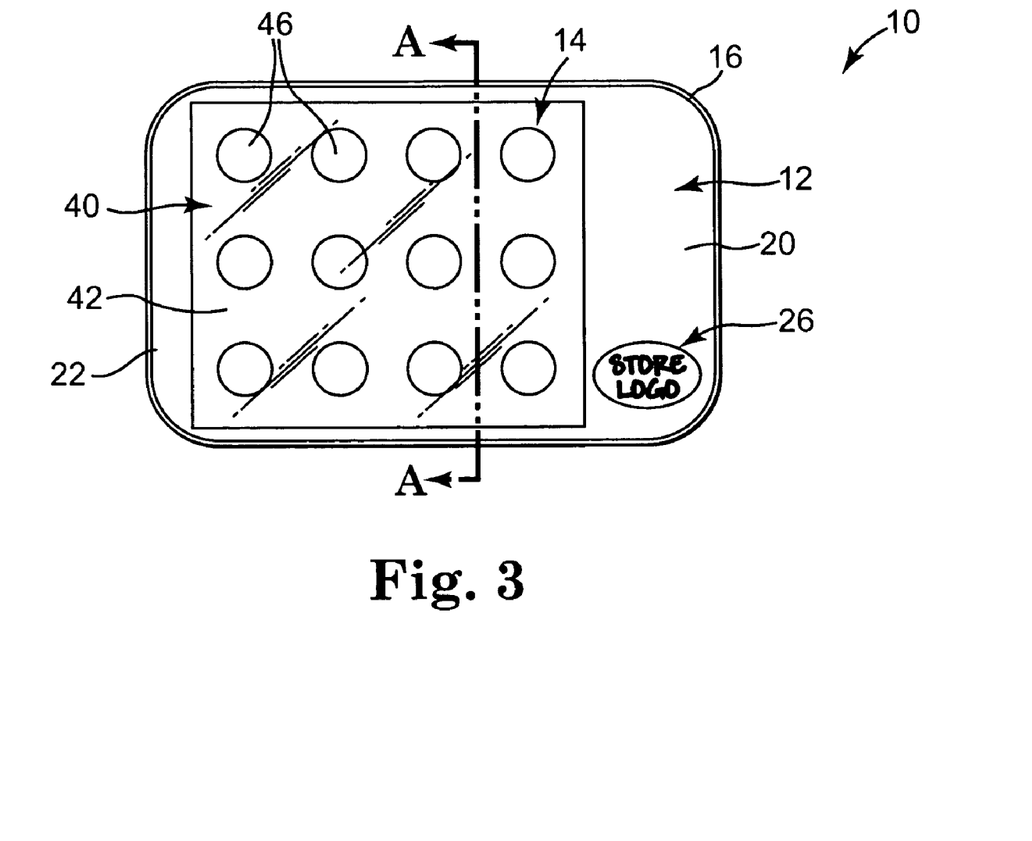
FIG. 3 is a top view of the stored-value card assembly of FIG. 1.
Figure 3A:
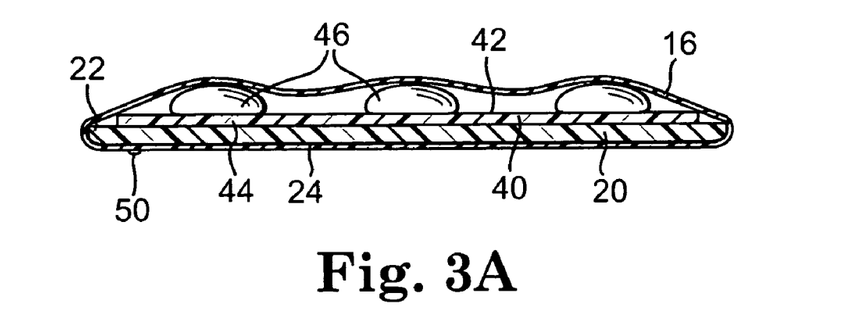
FIG. 3A is a cross-sectional view of FIG. 3 taken along the line A—A.

As indicated with reference to FIGS. 1, 3, and 3A, stored-value card 12 and candy 14 are partially secured to one another and/or protected from outside contamination via wrapper 16. In one embodiment, wrapper 16 is a cellophane or other suitable material configured to be sealed about stored-value card 12 and candy 14. In one example, wrapper 16 is generally placed over planar panel 20 and candy 14, extends around the edges of planar panel 20, and down and around second surface 24 of planar panel 20. Wrapper 16 includes a heat seal 50 adhering one portion of wrapper 16 to another to collectively form and entirely encompass the remainder of the stored-value card assembly 10.

Accordingly, wrapper 16 protects each candy piece 46 from contamination from external sources, e.g. dirt, dust, germs, and other contaminants and from outside air that may expedite the aging or decomposition of each candy piece 46. In one example, wrapper 16 is applied to extend tightly around and fit closely to the remainder of stored-value card assembly 10 such that wrapper 16 interacts with each candy piece 46 as well as stored-value card 12. Due to the tight wrapping of wrapper 16, candy 14 is secured in place relative to stored-value card 12. Accordingly, candy 14 with paper card 40 is secured to stored-value card 12 by adhesive and/or by wrapper 16. Securing candy pieces 46 to paper card 40 and adhering paper card 40 to stored-value card 12 and/or interposing candy pieces and support card 40 between wrapper 16 and stored-value card 12 are examples of means for removably coupling candy pieces 46 to stored-value card 12. Wrapper 16 is one example of means for maintaining cleanliness of candy 14.

Wrapper 16 is generally transparent or translucent in order to allow a bearer of stored-value card assembly 10 to view candy 14 as well as indicia 26 and 30 and account identifier 28 through wrapper 16. More specifically, in one embodiment, account identifier 28 is viewable and scannable through wrapper 16. In this respect, stored-value card 12 can be activated or loaded by scanning account identifier 28 through wrapper 16. In other examples, wrapper 16 is another suitable and generally translucent or transparent material secured about and vacuum or otherwise sealed to the remainder of stored-value card assembly 10. In one example, wrapper 16 is heat shrunk to fit around the remainder of stored-value card assembly 10.

Figure 4A:
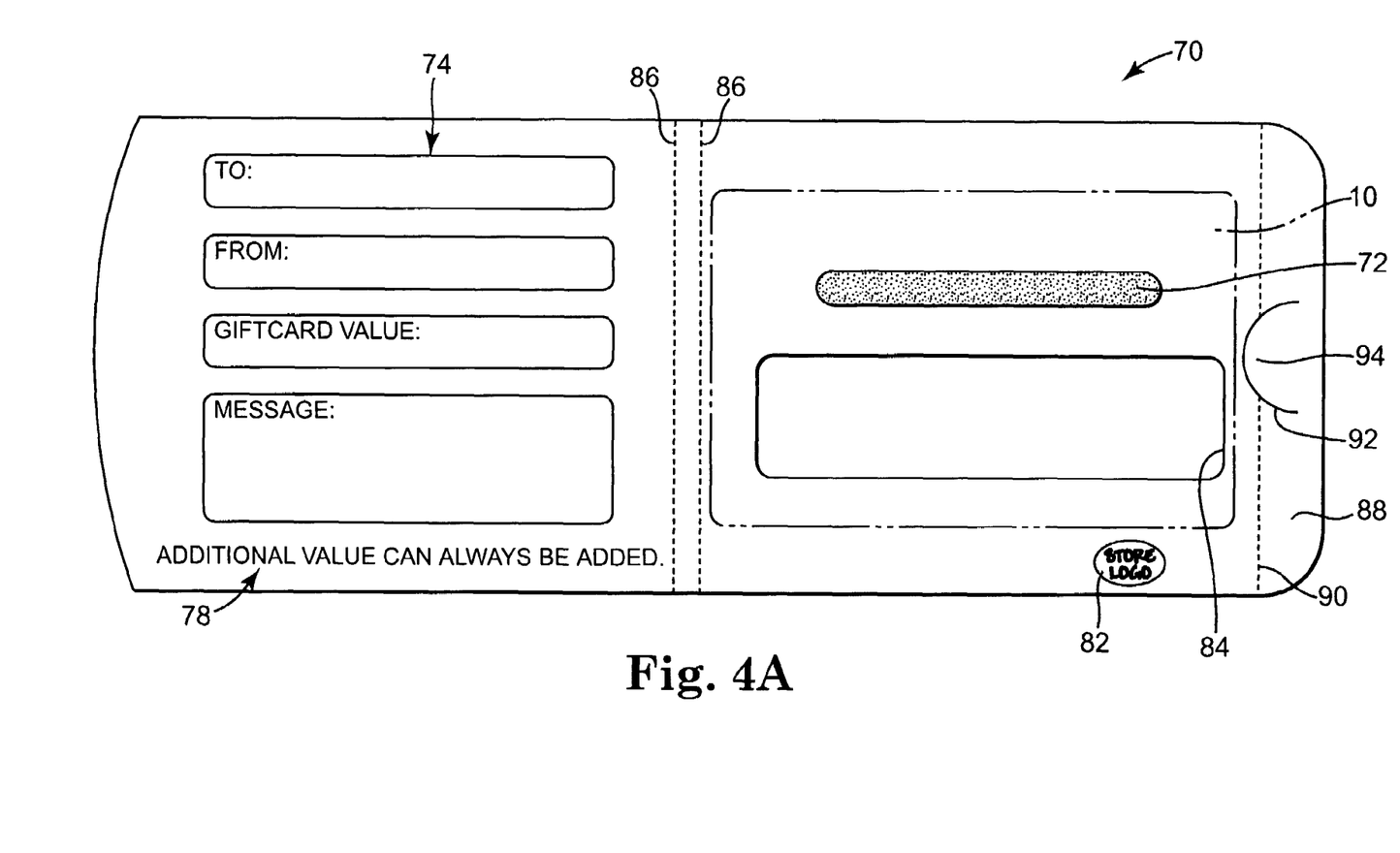
FIG. 4A is a front view of one embodiment of an unfolded backer for a stored-value card assembly, according to the present invention.
Figure 4B:
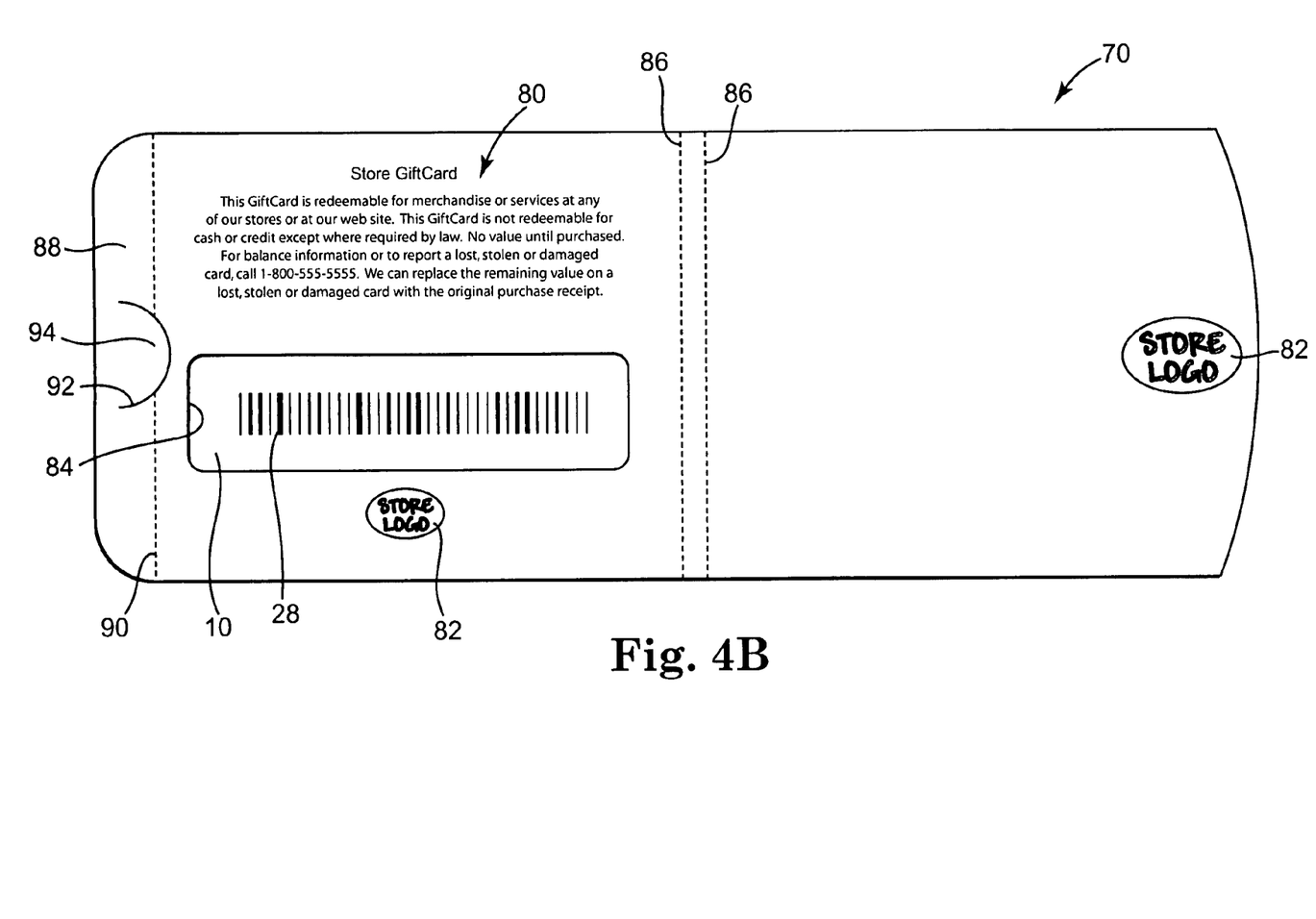
FIG. 4B is a back view of the unfolded backer of FIG. 4A.

FIGS. 4A and 4B illustrate a carrier or backer 70 for supporting stored-value card assembly 10. Stored-value card assembly 10 is readily releasably attached to backer 70, for example by an adhesive 72 or the like, and is represented in phantom lines in FIG. 4A. Backer 70 comprises a single layer or multiple layers of paper or plastic material, for example, generally in the form of a relatively stiff but bendable/flexible card. Other materials are also contemplated. Backer 70 displays indicia, graphics or text information including store logo(s), store name(s), slogans, advertising, instructions, directions, brand indicia, promotional information, holiday indicia, seasonal indicia, media format identifiers (e.g. characters, logos, scenes, or other illustrations relating to at least one of a movie, television show, book, etc.), characters, and/or other information.

Indicia 74, for example, include to, from, initial gift card value, and message fields. Indicia 78 notify a user and promote that additional value can always be added to or reloaded to stored-value card 12. Indicia 80 indicate that stored-value card 12 is redeemable for the purchase of goods and/or services and that, upon use, a value of the purchased goods and/or services will be deducted from the financial account or record linked to stored-value card 12. In one embodiment, indicia 80 include phrases such as "<NAME OF STORE>GiftCard" and "This GiftCard is redeemable for merchandise or services at any of our stores or at our website," and/or provides help or phone line information in case of a lost, stolen, or damaged stored-value card 12, etc. Indicia 82 identify a store, brand, department, etc. and/or services associated with stored-value card 12. Any of indicia 74, 78, 80, 82, or other indicia, optionally may appear anywhere on backer 70 or stored-value card assembly 10. Additional information besides that specifically described and illustrated herein also may be included.

Backer 70 defines a window or opening 84 for displaying account identifier 28 of stored-value card 12 as illustrated in FIG. 4B. As previously described, account identifier 28 is adapted for accessing a financial account or record associated with stored-value card 12 for activating, loading, or debiting from the financial account or record. Accordingly, window 84 allows access to account identifier 28 to activate and/or load stored-value card 12 without removing stored-value card assembly 10 from backer 70.

In one embodiment, backer 70 is a bi-fold substrate defining fold line(s) 86, about which backer 70 is foldable roughly in half. In FIGS. 4A and 4B, backer 70 is unfolded, i.e. is in an open configuration. According to one embodiment, FIG. 4A illustrates surfaces of backer 70 that will be supported on a rack or other fixture to face a customer of a retail store who is considering the purchase of stored-value card assembly 10. In another example, while on display in a retail store, backer 70 is folded back about at least one of fold line(s) 86 to present only the surfaces of backer 70 illustrated in FIG. 4A and positioned on the same side of fold line(s) 86 as stored-value card assembly 10 to a consumer. In such an embodiment, indicia 74 and 78 would not be visible to a consumer when backer 70 and stored-value card assembly 10 are placed for display in the retail store. Backer 70 is one example of means for removeably supporting stored-value card assembly 10 for display in a retail setting.

After purchase, backer 70 is foldable about fold line(s) 86 such that the FIG. 4A surfaces of backer 70 are folded towards each other and stored-value card assembly 10 is enclosed in a compact package formed by folded backer 70. In this manner, the surfaces of backer 70 illustrated in FIG. 4B are disposed toward the outside of the folded, compact package, according to embodiments of the invention. In one embodiment, folded backer 70 effectively wraps stored-value card assembly 10 for presentation from a consumer to a recipient. In one embodiment, fold line(s) 86 are two fold lines slightly spaced from one another to accommodate a thickness of stored-value card assembly 10. In other embodiments, fold line(s) 76 is a single fold line 86. Folding in the other direction about fold line(s) 86 for display on a rack in a retail setting, or about other fold line(s) of backer 70, is also contemplated.

In one embodiment, backer 70 optionally includes a tab 88 extending from one edge of backer 70 running parallel to fold line(s) 86. In on example, additional fold line 90 runs between tab 88 and the remainder of backer 70. In addition, a generally semi-circular cut 92 is formed from tab 88 through fold line 90 and partially onto the remainder of backer 70. In one embodiment, cut 92 is generally centered upon tab 88 and backer 70. Accordingly, semi-circular cut 92 defines a generally semi-circular flap 94, which can be partially bent away from the remainder of tab 88 and backer 70.

More specifically, upon folding of backer 70 about fold line(s) 86, tab 88 is folded upward about fold line 90 and flap 94 is pulled away from tab 88 to interface with an opposing edge of backer 70. In this respect, the opposing edge of backer 70 can be tucked beneath flap 94 to maintain backer 70 in a folded or closed position (not shown). Backers similar to backer 70 can be used with various sizes and shapes of stored-value card assembly 10. Other backers or packages are also contemplated for supporting stored-value card assembly 10.

Figure 5:
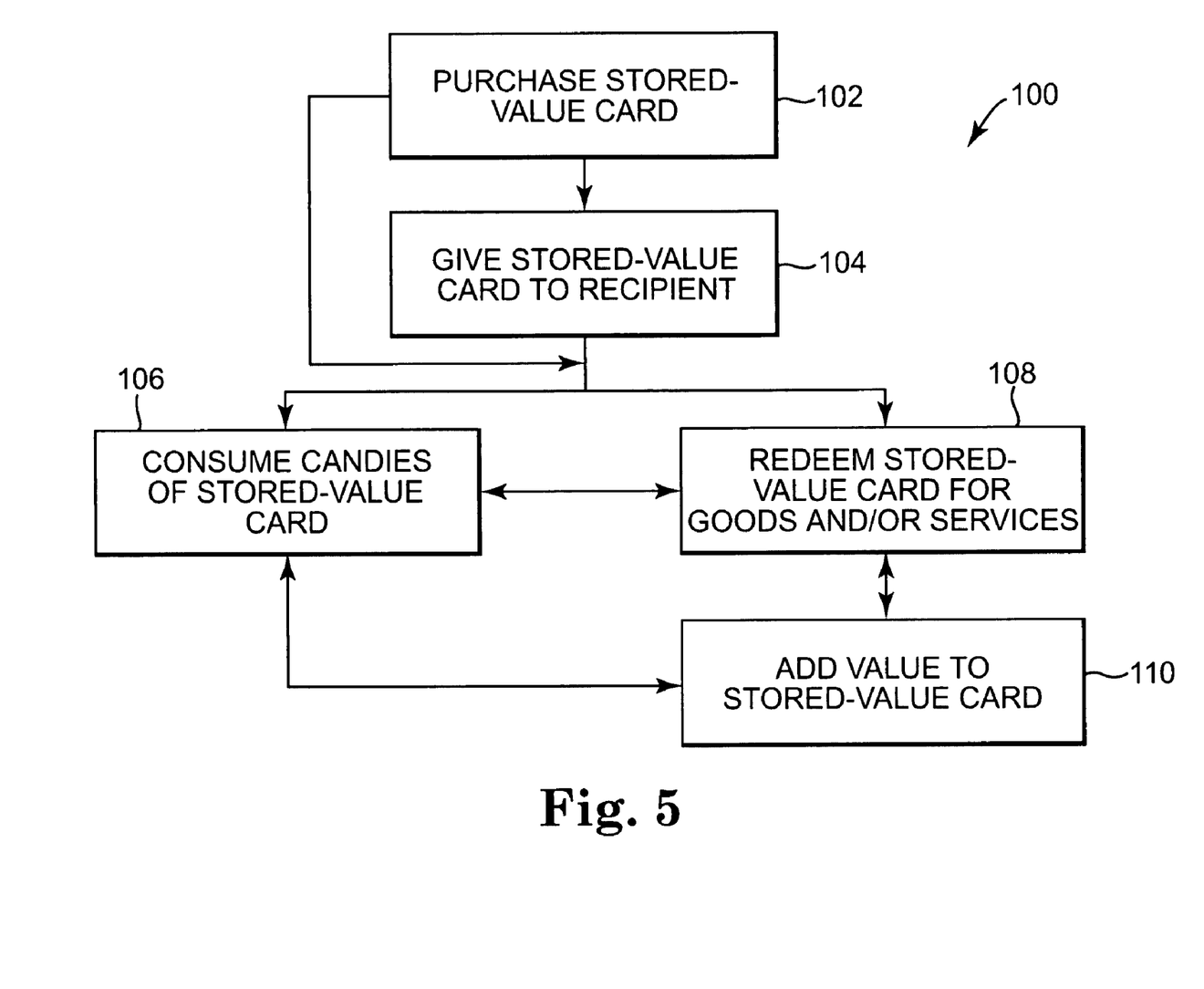
FIG. 5 is a flow chart illustrating one embodiment of a method of using a stored-value card assembly, according to the present invention.

FIG. 5 illustrates a flow chart of one embodiment of a method 100 of using stored-value card assembly 10. At 102, a potential consumer of stored-value card assembly 10, which is displayed in a retail store, decides to and does purchase stored-value card assembly 10 from the retail store. Upon purchasing of stored-value card assembly 10, a retail store employee, retail store kiosk, or other person or device scans account identifier 28 through wrapper 16 to access the financial account or record linked to account identifier 28 and to thereby activate or load value onto stored-value card 12. At 104, the consumer optionally gives stored-value card assembly 10 to a recipient, such as graduate, a relative, a friend, expectant parents, one having a recent or impending birthday, a couple having a recent or impending anniversary, etc. As an alternative, the consumer can keep stored-value card assembly 10 for his or her own use.

At 106, the consumer or recipient, whoever is in current ownership or otherwise is the current bearer of stored-value card assembly 10, removes candy 14 from stored-value card 12. In particular, the bearer of stored-value card assembly 10 removes wrapper 16 from the remainder of stored-value card assembly 10. In one embodiment, wrapper 16 is relatively easily tearable from the remainder of stored-value card assembly 10 upon bearer interaction with wrapper 16. Once wrapper 16 is removed from stored-value card assembly 10, the bearer of stored-value card assembly 10 can remove each candy piece 46 from paper card 40 for consumption by him/herself or for distribution to any other individual for consumption. Accordingly, candy 14 provides one example of a means for providing a confectionary or other edible product to a bearer of stored-value card assembly 10.

At 108, the current bearer of stored-value card 12 redeems stored-value card 12 for goods and/or services from the retail store. At 110, the current bearer of stored-value card 12 optionally adds value to stored-value card 12, and more particularly, to the financial account or financial record associated with stored-value card 12, at the retail store or over the Internet. Upon interacting with and/or consuming candy 14 at 106, redeeming stored-value card 12 at 108, or adding value to stored-value card 12 at 110, the current bearer of stored-value card 12 or stored-value card assembly 10 subsequently can perform any of steps 106, 108, or 110 as desired. In one embodiment, the ability of the current bearer to repeat redeeming stored-value card 12 at 108 is limited by whether the financial account or record associated with stored-value card 12 has any value at the time of attempted redemption.

Although described above as occurring at a single retail store, in one embodiment, purchasing stored-value card assembly 10 at 102, redeeming stored-value card 12 at 108, and adding value to stored-value card 12 at 110, can each be performed at any one of a number of stores adapted to accept stored-value card 12 or over the Internet. In one example, the number of stores are each part of a chain of similarly branded stores. In one example, the number of stores includes at least one website and/or at least one conventional brick and mortar store.

Stored-value cards come in many forms, according to embodiments of the invention. The gift card, like other stored-value cards, can be "re-charged" or "reloaded" at the direction of the original consumer, a gift recipient, or a third party. The term "loading on" or "loaded on" herein should be interpreted to include adding to the balance of a financial account or a financial record associated with the stored-value card. The balance associated with the stored-value card declines as the card is used, encouraging repeat visits to the retail store. The stored-value card remains in the user's purse or wallet, serving as an advertisement or reminder to re-visit the associated merchant as well as providing the bearer with an edible product. Gift cards, according to embodiments of the invention, provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Accordingly, stored-value card assemblies according to embodiments of the present invention provide means for storing monetary value for the future purchase of goods and/or services from a retail store such as a conventional brick and mortar store or a website. In addition, a stored-value card assembly according to an embodiment of the present invention provides the bearer with a confectionary or sweet treat such as a candy product (e.g. old-fashioned candy buttons).

Although the invention has been described with respect to particular embodiments, such embodiments are for illustrative purposes only and should not be considered to limit the invention. Various alternatives and changes will be apparent to those of ordinary skill in the art. For example, stored-value card 12 optionally is a physical card made of plastic, paper, generally stiff paper, other substrate, or the like. Adding value to stored-value card 12 optionally includes an either fixed amount or an amount that can be chosen by the consumer or other user. Other modifications within the scope of the invention and its various embodiments will be apparent to those of ordinary skill.

What is claimed is:

1. A stored-value card assembly comprising:
    a stored-value card defining a first substantially planar surface and a second substantially planar surface opposite the first substantially planar surface, wherein an account identifier is included on the second substantially planar surface, the account identifier linking the stored-value card to at least one of a financial account and a financial record;
    an edible product removably secured to the first substantially planar surface of the stored-value card; and
    a wrapper enclosing the edible product in a manner adapted to protect the edible product from contamination.

2. The stored-value card assembly of claim 1, wherein the edible product is removably coupled to an intermediate card that is coupled to the stored-value card.

3. The stored-value card assembly of claim 1, wherein the edible product is candy.

4. The stored-value card assembly of claim 1, wherein the edible product is a plurality of candy pieces arranged in an array.

5. The stored-value card assembly of claim 4, wherein the array of edible products is coupled to a support card, and the support card is removably secured to the first substantially planar surface of the stored value card.

6. The stored-value card assembly of claim 1, further comprising:
    indicia relating to at least one of a product, a brand, a store, a holiday, a season, an occasion, and a media format.

7. The stored-value card assembly of claim 1, wherein the wrapper encloses the stored-value card and the edible product.

8. The stored-value card assembly of claim 1, wherein the wrapper is one of translucent and transparent.

9. The stored-value card assembly of claim 1, wherein the wrapper includes cellophane.

10. The stored-value card assembly of claim 1, wherein the stored-value card is substantially sized to fit within a wallet.

11. The stored-value card assembly of claim 1, in combination with a backer releasably coupled to and selectively supporting the stored-value card assembly.

12. The combination of claim 11, wherein the backer is adapted to be selectively foldable between a first configuration and a second configuration, the first configuration being adapted to display the stored-value card assembly in a retail setting, and the second configuration being adapted to wrap the stored-value card assembly for presentation to a recipient.

13. The combination of claim 11, wherein the backer is adapted to provide access to the account identifier of the stored-value card through a portion of the backer.

14. A financial transaction card product comprising:
    means for providing rigidity to the financial transaction card product;
    means for linking the means for providing rigidity with a financial account or a financial record;
    means for removably coupling a confectionary treat to the means for providing rigidity; and
    means for maintaining cleanliness of the confectionary treat comprising a wrapper enclosing the means for linking, the means for providing rigidity, and the confectionary treat.

15. The financial transaction card product of claim 14, further comprising:
    means for associating the financial transaction card product with at least one of a product, a brand, a store, a holiday, a season, an occasion, and media format.

16. The financial transaction card product of claim 14, in combination with means for removably supporting the financial transaction card product for display in a retail setting.

17. A method of promoting the sale of a gift card linked to a financial account or a financial record, the method comprising:
    releasably coupling a gift card to an edible product to form a gift card assembly, wherein the edible product includes a plurality of candy pieces;
    releasably coupling the gift card assembly to a carrier configured to support the gift card assembly; and
    displaying the gift card assembly and the carrier to a potential consumer such that the edible product is visible to the potential consumer to entice the potential consumer to purchase the gift card assembly.

18. The method of claim 17, wherein the plurality of candy pieces are arranged in an array that is substantially aesthetically appealing to the potential consumer.

19. The method of claim 18, wherein displaying the gift card assembly includes folding the carrier to visually expose the gift card and the edible product.

20. The method of claim 17, wherein releasably coupling the gift card to the edible product includes enclosing the gift card and the edible product with a wrapper.

21. A method of using a financial card assembly, the method comprising:

providing a financial card assembly including a candy product and a card linked to a financial account or a financial record, wherein the financial card assembly is substantially planar;

activating the card to permit deductions from the financial account or the financial record;

consuming the candy product; and using the card in payment of goods or services, the value of the goods or services being deducted from the financial account or the financial record.

22. The method of claim 21, wherein activating the card includes scanning an account identifier on the card through an opening in a package that selectively supports the card.

23. The method of claim 21, wherein the card includes indicia related to at least one of a holiday, a season, an occasion, and a media format, and the method further comprises:

presenting the financial card assembly as a gift to a recipient on the basis at least one of the holiday, the season, the occasion, and the media format.

24. The method of claim 21, wherein providing a financial card assembly includes enclosing the candy product and the card with a wrapper.

* * * * *